United States Patent
Qiu et al.

(10) Patent No.: US 12,518,509 B2
(45) Date of Patent: Jan. 6, 2026

(54) SYSTEM AND METHOD WITH DIFFUSION-BASED OUTLIER SYNTHESIS FOR ANOMALY DETECTION

(71) Applicant: Robert Bosch GmbH, Stuttgart (DE)

(72) Inventors: Chen Qiu, Pittsburgh, PA (US);
Clement Fung, Pittsburgh, PA (US);
Maja Rudolph, Madison, WI (US)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 18/476,622

(22) Filed: Sep. 28, 2023

(65) Prior Publication Data
US 2025/0111649 A1    Apr. 3, 2025

(51) Int. Cl.
*G06V 10/764* (2022.01)

(52) U.S. Cl.
CPC ................. *G06V 10/764* (2022.01)

(58) Field of Classification Search
CPC ........... G06T 2207/20081; G06T 11/00; G06T 2207/20084; G06T 11/60; G06T 5/70; G06T 5/60; G06T 2200/24; G06T 5/77; G06T 5/50; G06T 7/11; G06T 11/001; G06T 3/4053; G06T 2207/30196; G06T 7/0012; G06T 2207/10024; G06T 7/70; G06T 2207/30168; G06T 3/40; G06T 7/0002; G06T 19/20; G06T 2207/20221; G06T 2207/20076; G06V 10/82; G06V 10/774; G06V 10/764; G06V 10/761; G06V 20/70; G06V 10/25; G06V 10/40; G06V 10/44; G06V 10/26; G06V 10/776; G06V 10/945; G06V 10/56; G06V 10/771; G06V 2201/07
See application file for complete search history.

(56) References Cited

U.S. PATENT DOCUMENTS

2020/0160982 A1* 5/2020 Gurson .................. G16H 50/70
2020/0334493 A1* 10/2020 Wu ....................... G06V 10/764
(Continued)

OTHER PUBLICATIONS

Hendrycks et al., "Deep Anomaly Detection With Outlier Exposure," arXiv:1812.04606v3 [cs.LG], Jan. 28, 2019, pp. 1-18.
(Continued)

*Primary Examiner* — Alex Kok S Liew
(74) *Attorney, Agent, or Firm* — Kathy Takeguchi; Maginot, Moore & Beck LLP

(57) ABSTRACT

A computer-implemented system and method relate to anomaly detection. A first source image is obtained from a first image set and a second source image is obtained from a second image set of an in-distribution image dataset. A diffusion model generates a modified image using the first source image and the second source image. A non-anomalous label is automatically generated for the first source image. The non-anomalous label is also generated for the second source image. An anomalous label is generated for the modified image. A training dataset is created. The training dataset includes at least the first source image with the non-anomalous label, the second source image with the non-anomalous label, and the modified image with the anomalous label. A machine learning model is trained or fine-tuned using the training dataset. The machine learning model being configured to perform a task of anomaly detection.

20 Claims, 9 Drawing Sheets

(56) References Cited

U.S. PATENT DOCUMENTS

2021/0027459 A1* 1/2021 Madabhushi .......... G06N 3/045
2024/0193911 A1* 6/2024 Diesendruck .......... G06T 11/00

OTHER PUBLICATIONS

Qiu et al., "Latent Outlier Exposure for Anomaly Detection with Contaminated Data," Proceedings of the 39th-International Conference on Machine Learning, Baltimore, Maryland, USA, Pmlr 162, 2022, pp. 18153-18167.

Mirzae et al., "Fake it Till You Make It: Towards Accurate Near-Distribution Novelty Detection," Eleventh International Conference on Learning Representations, 2023, pp. 1-27.

Song et al., "Denoising Diffusion Implicit Models," Ninth International Conference on Learning Representations 2021, arXiv:2010.025024v4 [cs.LG], Oct. 5, 2022, pp. 1-22.

Radford et al., "Learning Transferable Visual Models From Natural Language Supervision," Proceedings of the 38th International Conference on Machine Learning, PMLR 139, 2021, pp. 8748-8763.

Kwon et al., "Diffusion Models Already Have a Semantic Latent Space," ICLR 2023, arXiv:2210.10960v2 [cs.CV], Mar. 29, 2023, pp. 1-35.

Jeong et al., "Training-free Style Transfer Emerges from h-space in Diffusion Models," arXiv:2303.15403v1 [cs.CV], Mar. 27, 2023, pp. 1-26.

* cited by examiner

SYSTEM AND METHOD WITH DIFFUSION-BASED OUTLIER SYNTHESIS FOR ANOMALY DETECTION

FIELD

This disclosure relates generally to computer vision, and more particularly to digital image processing and anomaly detection.

BACKGROUND

In general, anomaly detection involves identifying samples that systematically deviate from the distribution of normal samples. Anomaly detection is valuable in a number of fields, such as financial security, cyber-security, healthcare applications, etc. Since anomalies are rare and may have critical consequences, there a number of challenges to collecting examples of anomalies and learning their distribution.

For example, the lack of enough labeled anomalies raises challenges in both anomaly detection model training and evaluation. Due to the missing training signals from labeled anomalies, the anomaly detection models may have depredated performance in detecting critical anomalies. Revealing the true performance of anomaly detection models requires a test set consisting of labeled normal data and labeled abnormal data. An absence of enough abnormal data in the test set may lead to a biased estimation of the model's performance. Also, the evaluation of anomaly detection models without access to abnormal samples is under-explored. In addition, the evaluation of anomaly detection models may be a bottleneck in developing new, advanced anomaly detection models.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to an example aspect, a computer-implemented method relates to anomaly detection. The method includes receiving a first source image from a first image set and a second source image from a second image set of an in-distribution image dataset. The method includes generating, via a diffusion model, a modified image using the first source image and the second source image. The method includes automatically generating a non-anomalous label for the first source image and the non-anomalous label for the second source image. The method includes automatically generating an anomalous label for the modified image. The method includes creating a training dataset that includes at least the first source image with the non-anomalous label, the second source image with the non-anomalous label, and the modified image with the anomalous label. The method includes training or fine-tuning a machine learning model using the training dataset. The machine learning model is configured to perform a task of anomaly detection.

According to an example aspect, a system comprises one or more processors and at least one non-transitory computer readable medium, which is in data communication with the one or more processors. The at least one non-transitory computer readable medium has computer readable data including instructions stored thereon that, when executed by the one or more processors is configured to cause the one or more processors to perform a method. The method includes receiving a first source image from a first image set and a second source image from a second image set of an in-distribution image dataset. The method includes generating, via a diffusion model, a modified image using the first source image and the second source image. The method includes automatically generating a non-anomalous label for the first source image and the non-anomalous label for the second source image. The method includes automatically generating an anomalous label for the modified image. The method includes creating a training dataset that includes at least the first source image with the non-anomalous label, the second source image with the non-anomalous label, and the modified image with the anomalous label. The method includes training or fine-tuning a machine learning model using the training dataset. The machine learning model is configured to perform a task of anomaly detection.

According to an example aspect, a non-transitory computer readable medium has computer readable data including instructions stored thereon. The computer readable data is executable by one or more processors to perform a method. The method includes receiving a first source image from a first image set and a second source image from a second image set of an in-distribution image dataset. The method includes generating, via a diffusion model, a modified image using the first source image and the second source image. The method includes automatically generating a non-anomalous label for the first source image and the non-anomalous label for the second source image. The method includes automatically generating an anomalous label for the modified image. The method includes creating a training dataset that includes at least the first source image with the non-anomalous label, the second source image with the non-anomalous label, and the modified image with the anomalous label. The method includes training or fine-tuning a machine learning model using the training dataset. The machine learning model is configured to perform a task of anomaly detection.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Anomaly detection often involves the identification of outliers. However, such tasks are often performed assuming that only a small, unlabeled set of inlier data is available. Additionally, in order to tune and validate these anomaly detection models, a representative set of validation data is often required, whereby the validation data includes labeled normal samples and labeled abnormal samples. Such a dataset with validation data may be hard to acquire when anomaly detection is deployed in new applications and the distribution of outliers remain unknown. The AD system 100 solves this technical problem by providing a technical solution that relates to the generation of synthetic outliers and the training, fine-tuning, and/or validating of anomaly detection models using at least these synthetic outliers.

Figure 1:
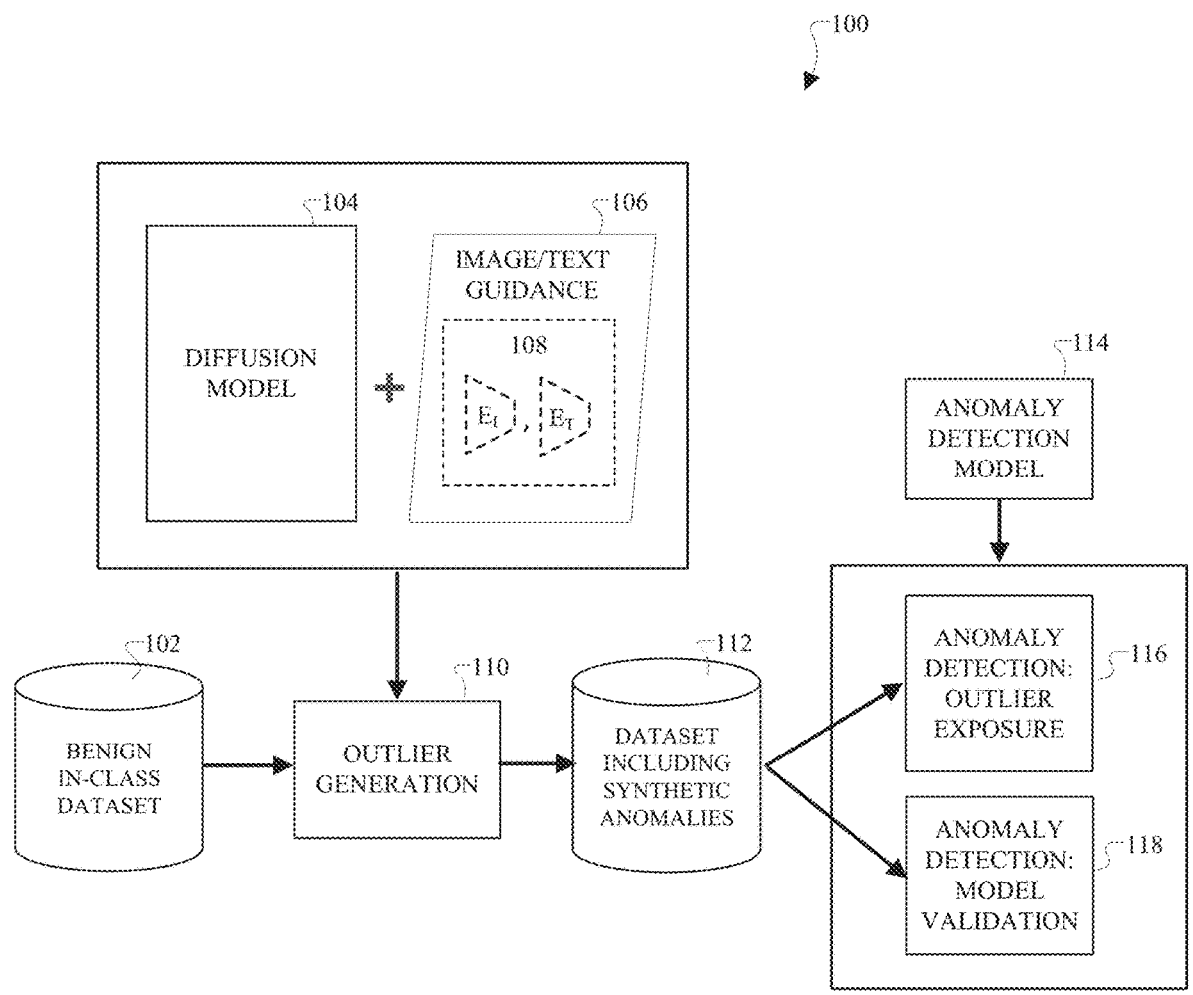
FIG. 1 is a flow diagram of an example of a system with diffusion-based outlier synthesis for anomaly detection according to an example embodiment of this disclosure.

FIG. 1 is a flow diagram of an example of an anomaly detection (AD) system 100 with diffusion-based outlier synthesis for anomaly detection according to an example embodiment. The AD system 100 leverages diffusion-based outlier synthesis for near-anomaly-detection use cases. The AD system 100 uses diffusion-based generation techniques for outlier exposure 116. The AD system 100 builds on diffusion-based generation with an asymmetric reverse process (Asyrp). Asyrp refers to a process that discovers the semantic latent space ("h-space") in frozen pretrained diffusion models. In addition, the AD system 100 builds on diffusion-based generation with DiffStyle. Diffstyle refers to a blending of the intermediate features of the content image in h-space into the generative process from the inverted style image, i.e., $x_T$.

In addition, as shown in FIG. 1, the AD system 100 generates synthetic outliers (e.g., generated/synthetic/modified images) to leverage them for training anomaly detection models 114 and/or evaluating anomaly detection models 114. The AD system 100 is also configured to generate synthetic anomalies for near-anomaly-detection use cases, such as outlier exposure 116, model validation 118, etc.

Also, the AD system 100 is configured to operate in a number of use cases, which are relevant to the outlier detection setting. For example, as shown in FIG. 1, the AD system 100 is configured to create and use a dataset 112 with the synthetic anomalies (or synthetic outliers) with respect to at least one anomaly detection model 114 as a validation dataset for model validation 118. The AD system 100 is configured to use the synthetic anomalies in domains where such a validation dataset does not exist. As another example, the AD system 100 is configured to use the synthetic anomalies (or synthetic outliers) of at least one anomaly detection model 114 as a training dataset for outlier exposure 116.

As discussed above, the AD system 100 is configured to use a dataset 112 with respect to the anomaly detection model 114 for validation 118. The dataset 112 includes the synthetic anomalies (e.g., the generated/modified/synthetic images) along with their corresponding source images of the benign in-class dataset 102. In addition, the AD system 100 is configured to generate a normal label or a non-anomalous label for the source images of the benign in-class dataset 102. The AD system 100 is configured to generate an anomalous label for each of the generated/modified/synthetic images. The AD system 100 may be configured to generate anomalous labels indicative of a degree of the modifications to the source images.

The AD system 100 assumes a small set of benign, in-class examples from a benign, in-class dataset 102 is available for training, but no validation set exists. The AD system 100 then performs a diffusion-based outlier generation method 110 via at least one pretrained diffusion model 104 together with image/text guidance 106 to create a dataset 112. This dataset 112 may be used in same/similar ways as a genuine validation dataset would be used selecting model hyperparameters, evaluating between candidate models architectures, and estimating performance on the test dataset. For a synthetic validation set to be effective, then (i) design choices made with the synthetic validation set should be similar to design choices made with the genuine validation set, and (ii) evaluation metrics such as area under the receiver operating characteristic curve (AUROC) should be similar between the synthetic and genuine validation sets.

The AD system 100 may include an experimental set-up in which the synthetic validation sets are evaluated. In such an experimental set-up, the AD system 100 uses (i) a battery of anomaly detectors (or anomaly detection models 114) of varying quality and (ii) a selection of anomaly detection tasks with labeled validation sets to create a ground truth benchmarking of the anomaly detectors ("ground truth validation"). The AD system 100 then benchmarks the anomaly detection models 114 on the test set with synthetic anomalies (e.g., generated/synthetic/modified images). These are then denoted as "synthetic validation" or "synthetic benchmark". An empirical study found that the "synthetic benchmark" closely reflects the "ground truth validation" both in terms of relative ranking and absolute AUROC of the anomaly detection methods, thereby encouraging the usage of synthetic anomalies for the validation of anomaly detectors in new deployment environments.

In addition to using synthetic outliers for validation 118, the AD system 100 is configured to use the synthetic outliers (e.g., the generated/modified/synthetic images) for improving the performance of anomaly detection models 114 through outlier exposure 116. For outlier exposure 116, the AD system 100 is configured to use a pretrained vision transformer model. The AD system 100 is configured to fine-tune the vision transformer model on a surrogate classification task and use distances in the trained embedding space as an anomaly detection.

A surrogate classification task for finetuning involves a binary classification layer added to the vision transformer model, and the anomaly detection model 114 is trained on benign in-class examples and synthetic outlier examples. In addition to the surrogate classification task, the AD system 100 also includes a regression-based task. The AD system 100 generates a variety of synthetic outliers with text-guidance, using varying edit strength α.

When fine-tuning the anomaly-detection model 114, the AD system 100 is configured to use a regression task to predict α. After fine-tuning, the AD system 100 removes the prediction head of the vision transformer model. The dataset 112 is then converted into the vision transformer model's embedding space (i.e., the last layer before the prediction layer) and used as a feature bank for anomaly detection. At test time, the L2 distance to the closest k examples in the feature bank is used as the anomaly score.

Figure 2:
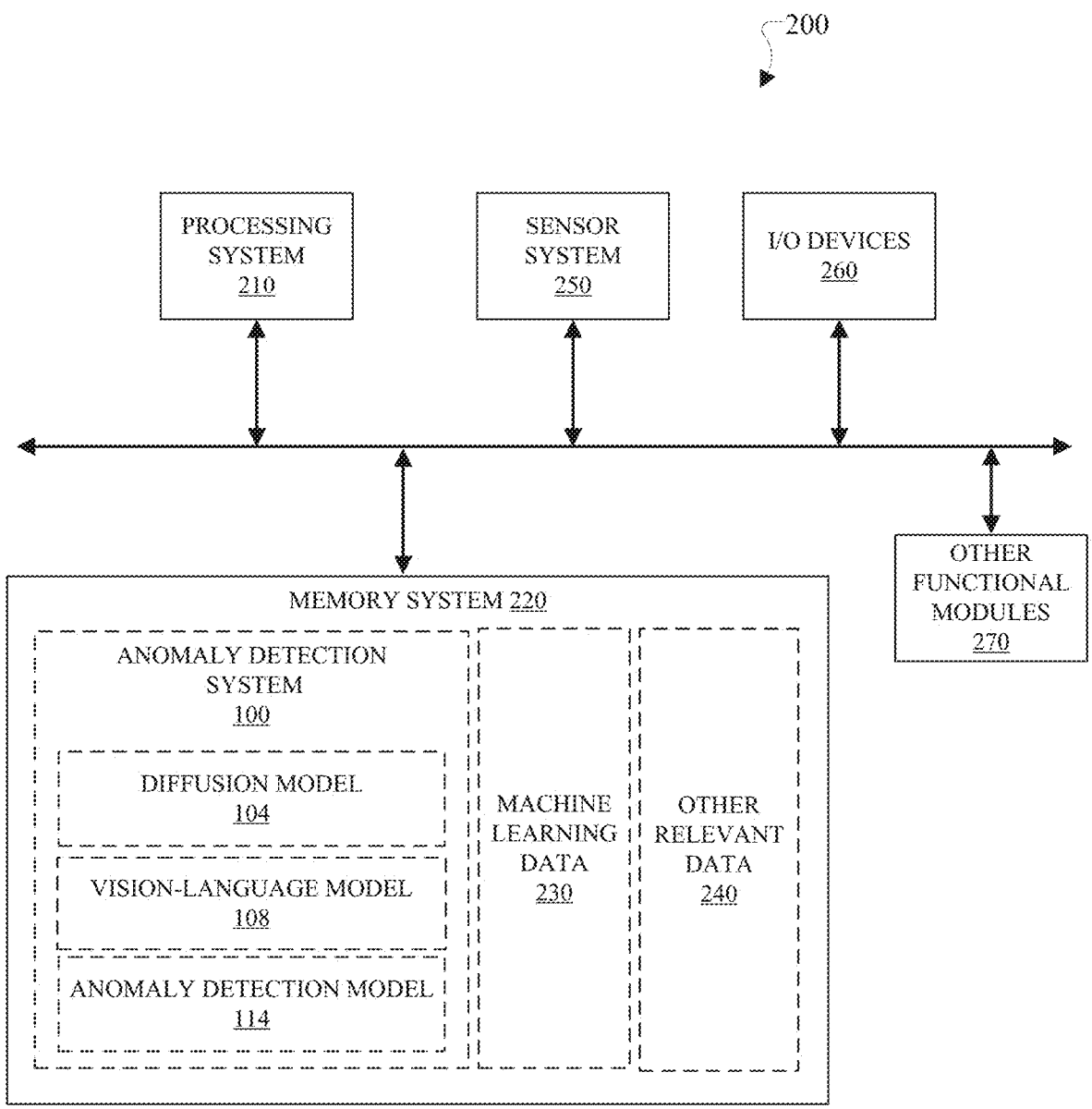
FIG. 2 is a diagram of an example of a system having an anomaly detection system with diffusion-based outlier synthesis according to an example embodiment of this disclosure.

FIG. 2 is a diagram of an example of a system 200 having the AD system 100 with diffusion-based outlier synthesis according to an example embodiment. The system 200 includes at least a processing system 210 with at least one processing device. For example, the processing system 210 includes at least an electronic processor, a central processing unit (CPU), a graphics processing unit (GPU), Tensor Processing Unit (TPU), a microprocessor, a field-programmable gate array (FPGA), an application-specific integrated circuit (ASIC), any suitable processing technology, or any number and combination thereof. The processing system 210 is operable to provide the functionality as described herein.

The system 200 includes a memory system 220, which is operatively connected to the processing system 210. In an example embodiment, the memory system 220 includes at least one non-transitory computer readable storage medium, which is configured to store and provide access to various data to enable at least the processing system 210 to perform the operations and functionality, as disclosed herein. In an example embodiment, the memory system 220 comprises a single memory device or a plurality of memory devices. The memory system 220 may include electrical, electronic, magnetic, optical, semiconductor, electromagnetic, or any suitable storage technology that is operable with the AD system 100. For instance, in an example embodiment, the memory system 220 may include random access memory (RAM), read only memory (ROM), flash memory, a disk drive, a memory card, an optical storage device, a magnetic storage device, a memory module, any suitable type of memory device, or any number and combination thereof. With respect to the processing system 210 and/or other components of the AD system 100, the memory system 220 is local, remote, or a combination thereof (e.g., partly local and partly remote). For example, the memory system 220 may include at least a cloud-based storage system (e.g. cloud-based database system), which is remote from the processing system 210 and/or other components of the AD system 100.

The memory system 220 includes at least an AD system 100, machine learning data 230, and other relevant data 240, which are stored thereon. More specifically, the AD system 100 includes computer readable data with instructions, which, when executed by the processing system 210, is configured to provide at least diffusion-based and image-based/text-based outlier synthesis for anomaly detection as described in this disclosure. The computer readable data may include instructions, code, routines, various related data, any software technology, or any number and combination thereof. The AD system 100 includes machine learning models, which include at least a pretrained diffusion model 104, a pretrained vision-language model 108, and an anomaly detection model 114. The pretrained diffusion model 104 is configured to perform at least a reverse diffusion process. For example, the pretrained diffusion model 104 comprises at least one denoising diffusion implicit model (DDIM). The pretrained diffusion model 104 includes at least an encoder (e.g. encoder 304 of FIG. 3 or encoder 606 of FIG. 6) or an image encoding network. The pretrained diffusion model 104 includes at least a decoder (e.g. decoder 310 of FIG. 3 or decoder 616 of FIG. 6) or an image decoding network. Also, as an example, the pretrained vision-language model 108 includes contrastive language-image pre-training (CLIP), which includes at least an image encoder (denoted as $E_I$) and a text encoder (denoted as $E_T$). The anomaly detection model 114 is a machine learning model, which is configured to perform anomaly detection. The anomaly detection model 114 is configured to generate prediction data indicative of an anomalous detection or a non-anomalous detection in response to input, such as sensor data (e.g., digital images). For example, the anomaly detection model 114 may comprise a classifier (e.g., binary classifier with classes of anomalous and non-anomalous) or a regression model. The anomaly detection model 114 may comprise an autoencoder-based anomaly detection model, a self-supervised anomaly detection model, a kernel-based anomaly detection model, any other anomaly detection model, or any number and combination thereof.

Also, the machine learning data 230 includes sensor data, source image data, various loss data, various weight data, various parameter data, and any relevant data that enables the AD system 100 to learn and/or execute the functions as described in this disclosure. The machine learning data 230 includes the benign in-class dataset 102, the dataset 112, the synthetic anomalies (e.g., the generated/modified/synthetic images), as well as various data related to outlier exposure 116 and/or model validation 118. Meanwhile, the other relevant data 240 provides various data (e.g. operating system, etc.), which enables the AD system 100 to perform the functions as discussed herein.

The system 200 may include at least one sensor system 250. The sensor system 250 includes one or more sensors. For example, the sensor system 250 includes an image sensor, a camera, a radar sensor, a light detection and ranging (LIDAR) sensor, a thermal sensor, an ultrasonic sensor, an infrared sensor, a motion sensor, an audio sensor, an inertial measurement unit (IMU), any suitable sensor, or any number and combination thereof. The sensor system 250 is operable to communicate with one or more other components (e.g., processing system 210 and memory system 220) of the system 200. For example, the sensor system 250 may provide sensor data, which is then used by the processing system 210 to generate image data (e.g., digital images)

based on the sensor data. In this regard, the processing system 210 is configured to obtain the sensor data directly or indirectly from one or more sensors of the sensor system 250. The sensor system 250 is local, remote, or a combination thereof (e.g., partly local and partly remote). Upon receiving the sensor data, the processing system 210 is configured to process this sensor data and/or generate image data (e.g., digital images) in connection with the AD system 100, the machine learning data 230, the other relevant data 240, any suitable software and/or hardware components, or any number and combination thereof.

In addition, the system 200 may include at least one other component. For example, as shown in FIG. 2, the memory system 220 is also configured to store other relevant data 240, which relates to operation of the AD system 100 in relation to one or more components (e.g., sensor system 250, I/O devices 260, and other functional modules 270). In addition, the system 200 is configured to include one or more I/O devices 260 (e.g., display device, keyboard device, speaker device, etc.), which relate to the AD system 100. Also, the system 200 includes other functional modules 270, such as any appropriate hardware, software, or combination thereof that assist with or contribute to the functioning of the AD system 100. For example, the other functional modules 270 include communication technology that enables components of the system 200 to communicate with each other as described herein. In this regard, the system 200 is operable to perform the functions of the AD system 100. The system 200 is operable to train, validate, test, employ, and/or deploy the anomaly detection model 114 with diffusion-based outlier synthesis for anomaly detection, as described herein.

Figure 3:
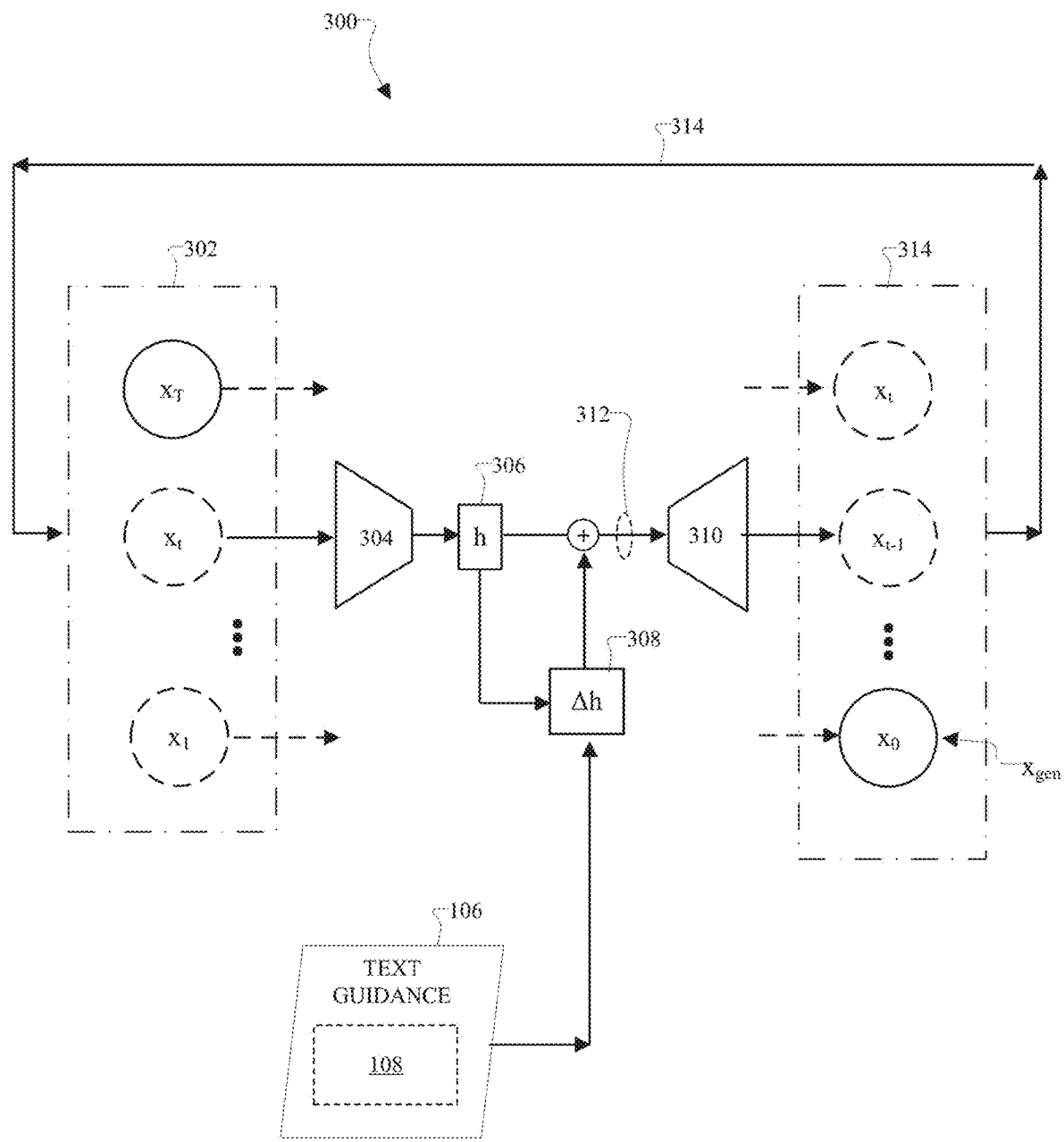
FIG. 3 is a diagram of an example of a diffusion-based process with text guidance according to an example embodiment of this disclosure.

FIG. 3 is a flow diagram that relates to a process 300 of generating a modified image (or a generated image $x_{gen}$) according to an example embodiment. The AD system 100 uses some components of the Asyrp process to create text-guided generations, but the AD system 100 is different from the original Asyrp process in at least two ways. First, the AD system 100 uses non-domain-specific text-guidance. Secondly, the AD system 100 defines the edit-strength of each anomaly. In contrast, the original Asyrp process is evaluated on well-defined domains, and assumes that the source and target text are known (e.g, modifying "face" to "smiling face"). In contrast, the AD system 100 provides more general solution that does not assume a specific domain and does not require domain-specific texts as input.

First, the AD system 100 is configured to extract a meaningful direction for ΔT such that using a source text is unneeded. The AD system 100 is configured to extract a meaningful direction for ΔT by using an image encoder $E_I$ and a source image $x_{source}$. Second, the AD system 100 uses auxiliary, out-of-domain texts $y_{aux}$, whereas Asyrp uses target texts. The AD system 100 includes these two features in defining directional loss $L_{dir}'$. Specifically, the AD system 100 computes directional loss data via equation 3.

$$\Delta T' = E_T(y_{aux}) - E_I(x_{source}) \quad [1]$$

$$\Delta I = E_I(x_{target}) - E_I(x_{source}) \quad [2]$$

$$L_{dir}' = 1 - \frac{\Delta I \cdot \Delta T'}{\|\Delta I\| \|\Delta T'\|} \quad [3]$$

The AD system 100 follows the training procedure for Asyrp's h-space extractor, which is defined to extract Δh, the direction in h-space that induces the desired change. Once Δh is found, the AD system 100 applies Asyrp during the reverse diffusion process, but uses the linear property of h-space and defines an edit strength α, which indicates a level of how strongly to modify the image. Given a reverse diffusion process D that generates an image x from latent code z as expressed by x=D(z), the AD system 100 adds an h-space term, Δh, to generate the generated/modified/synthetic image (i.e., $x_{gen}$ such as $x_0$). The h-space term, Δh, may be referred to as additional embedding data 308 herein. The AD system 100 generates the modified image via equation 4.

$$x_{gen} = D(z + \alpha \Delta h) \quad [4]$$

Also, FIG. 3 illustrates a number of iterations of the process 300 involving input data 302 and corresponding output data 314. More specifically, the AD system 100 includes a number of iterations of the process 300 in which input data 302 from $x_T$ to $x_1$ generates output data 314 from $x_t$ to $x_0$, respectively. In this example, $x_0$ refers to the generated/modified/synthetic image and $x_T$ refers to a latent code of the source image that is generated via a forward diffusion process of the diffusion model 104. Also, in this example, $x_T$ may be a noisy image comprising Gaussian noise. In addition, FIG. 3 shows that the process 300 involves at least an encoder 304 of the diffusion model 104 and a decoder 310 of the diffusion model 104. In this regard, for example, the encoder 304 receives the input data 302 and generates embedding data 306 by encoding the input data 302. As an example iteration, the AD system 100 is configured to (i) obtain $x_T$ as input to the encoder 304, (ii) encode, via the encoder 304, the input (e.g. $x_T$) to generate embedding data 306 based on $x_T$, (iii) generate updated embedding data 312 by combining the embedding data 306 with additional embedding data 308 (Δh), and (iv) decode, via the decoder 310, the updated embedding data 312 to generate a generated/synthetic/modified image (e.g. $x_t$). As another example, for instance, in the next iteration, the AD system 100 is configured to (i) obtain $x_t$ as input to the encoder 304, (ii) encode, via the encoder 304, the input (e.g. $x_t$) to generate embedding data 306 based on $x_t$, (iii) generate updated embedding data 312 by combining the embedding data 306 with additional embedding data 308, and (iv) decode, via the decoder 310, the updated embedding data 312 to generate a generated/synthetic/modified image (e.g. $x_{t-1}$). The AD system 100 is configured to continue this process 300 for a number of iterations until a generated/modified/synthetic image ($x_0$) is generated as output data 314. In this example, for instance, the dataset 112 includes at least (i) source images from the benign in-class dataset 102 along with corresponding normal/non-anomalous labels and (ii) each generated/modified/synthetic images ($x_0$) along with corresponding anomalous labels.

Figure 4:
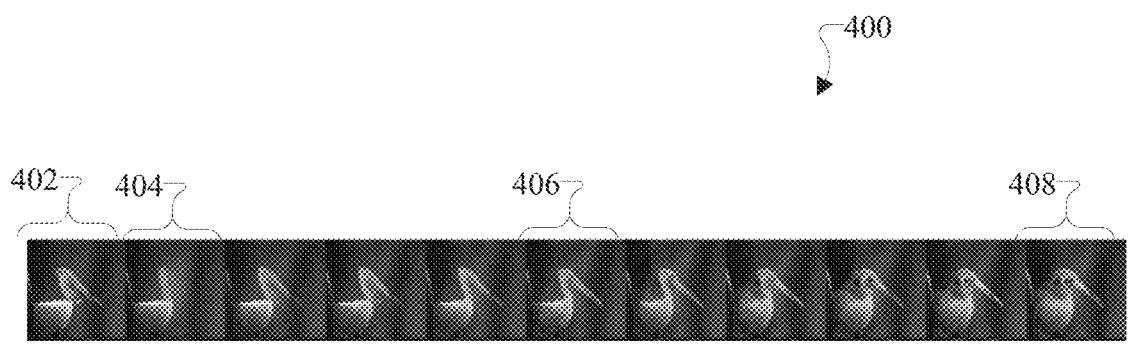
FIG. 4 is a diagram with an example of a sequence of synthetic out-of-distribution images with increasing editing strength according to an example embodiment of this disclosure.

FIG. 4 is a diagram with an example of a sequence 400 of synthetic out-of-distribution images with increasing editing strength α∈[0,1] according to an example embodiment. More specifically, the sequence 400 includes a source image 402 followed by a set of synthetic out-of distribution images. In this non-limiting example, the source image 402 is an image of a Tennessee Warbler, which is a type of bird.

The set of synthetic out-of-distribution images include a number of generated images. Each generated image $x_{gen}$ is represented as $x_0$ in FIG. 3. Each generated image comprises the source image 402, which has been guided by "dolphin" as an auxiliary, out-of-domain text (i.e., $y_{aux}$=dolphin). For instance, the set of synthetic out-of-distribution images include a generated image 404 (i.e., $x_0$ with lowest $\alpha$ value from among this set) and a generated image 414 (i.e., $x_0$ with highest $\alpha$ value from among this set). Also, as non-limiting examples, the set of synthetic out-of-distribution images include a number of generated images, which are between generated image 404 and generated image 414, such as generated image 406, generated image 408, generated image 410, generated image 412, and several other images of the set shown in FIG. 4, that exhibit increasing $\alpha$ values in that order. In this regard, the generated image 404 (i.e., $x_0$) has a lower $\alpha$ value than the generated image 406 (i.e., $x_0$). The generated image 406 (i.e., $x_0$) has a lower $\alpha$ value than the generated image 408 (i.e., $x_0$). The generated image 408 (i.e., $x_0$) has a lower $\alpha$ value than the generated image 410 (i.e., $x_0$). The generated image 410 (i.e., $x_0$) has a lower $\alpha$ value than the generated image 412 (i.e., $x_0$). The generated image 412 (i.e., $x_0$) has a lower $\alpha$ value than the generated image 414 (i.e., $x_0$). The lower $\alpha$ represents a lesser degree of modification in the direction of the text guidance (e.g., "dolphin") with respect to the source image (e.g., "Tennessee Warbler" image).

As described above, as an example, the AD system 100 is configured to create a dataset 112, which may include at least the source image 402 and each of the generated/synthetic/modified images (e.g., image 404, image 406, image 408 image 410, image 412, image 414, etc.) of the sequence 400. In addition, the AD system 100 is also configured to generate an anomalous label (or various classes of anomalous labels) for each of the generated images of the sequence 400. That is, the AD system 100 is configured to create a dataset 112, which includes (i) the source image 402 along with a non-anomalous label for the source image 402 and (ii) each of the generated/synthetic/modified images of the sequence 400 along with a corresponding anomalous label for each of the generated images of the sequence 400 shown in FIG. 4. This dataset may be used in training, fine-tuning, or validating the anomaly detection model 114 for a particular application.

Figure 5:
FIG. 5 is a diagram with another example of a sequence of synthetic out-of-distribution images with increasing editing strength according to an example embodiment of this disclosure.
Figure 5:
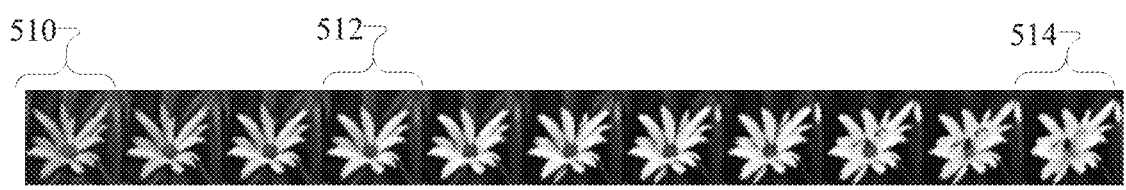

FIG. 5 is a diagram with another example of a sequence 500 of synthetic out-of-distribution images with increasing editing strength $\alpha \in [0,1]$ according to an example embodiment. More specifically, the sequence 500 includes a source image 502 followed by a set of synthetic out-of distribution images. In this non-limiting example, the source image 502 is an image of a Sword Lily, which is a type of flower.

The set of synthetic out-of-distribution images include a number of generated images. Each generated image $x_{gen}$ is represented as $x_0$ in FIG. 3. Each generated image comprises the source image 502, which has been guided by "dolphin" as an auxiliary, out-of-domain text (i.e., $y_{aux}$=dolphin). For instance, the set of synthetic out-of-distribution images include a generated image 504 (i.e., $x_0$ with lowest $\alpha$ value from among this set) and a generated image 514 (i.e., $x_0$ with highest $\alpha$ value from among this set). Also, as non-limiting examples, the set of synthetic out-of-distribution images include a number of generated images, which are between generated image 504 and generated image 514, such as generated image 506, generated image 508, generated image 510, generated image 512, and several other images of the set shown in FIG. 4, that exhibit increasing $\alpha$ values in that order. In this regard, the generated image 504 (i.e., $x_0$) has a lower $\alpha$ value than the generated image 506 (i.e., $x_0$). The generated image 506 (i.e., $x_0$) has a lower $\alpha$ value than the generated image 508 (i.e., $x_0$). The generated image 508 (i.e., $x_0$) has a lower $\alpha$ value than the generated image 510 (i.e., $x_0$). The generated image 510 (i.e., $x_0$) has a lower $\alpha$ value than the generated image 512 (i.e., $x_0$). The generated image 512 (i.e., $x_0$) has a lower $\alpha$ value than the generated image 514 (i.e., $x_0$). The lower $\alpha$ represents a lesser degree of modification in the direction of the text guidance (e.g., "dolphin") with respect to the source image (e.g., "Sword Lily" image).

As described above, as an example, the AD system 100 is configured to create a dataset 112, which may include at least the source image 502 and each of the generated images (e.g., image 504, image 506, image 508 image 510, image 512, image 514, etc.) of the sequence 500. In addition, the AD system 100 is also configured to generate an anomalous label (or various anomalous labels for different degrees of modifications to the source image) for each of the generated images of the sequence 500. That is, the AD system 100 is configured to create a dataset 112, which includes (i) source image 502 along with a non-anomalous label for the source image 502 and (ii) each of the generated images ($x_{gen}$ or $x_0$) of the sequence 500 along with a corresponding anomalous label for each of the generated images of the sequence 500 shown in FIG. 5. This dataset may be used in training, fine-tuning, or validating the anomaly detection model 114 for a particular application.

Figure 6:
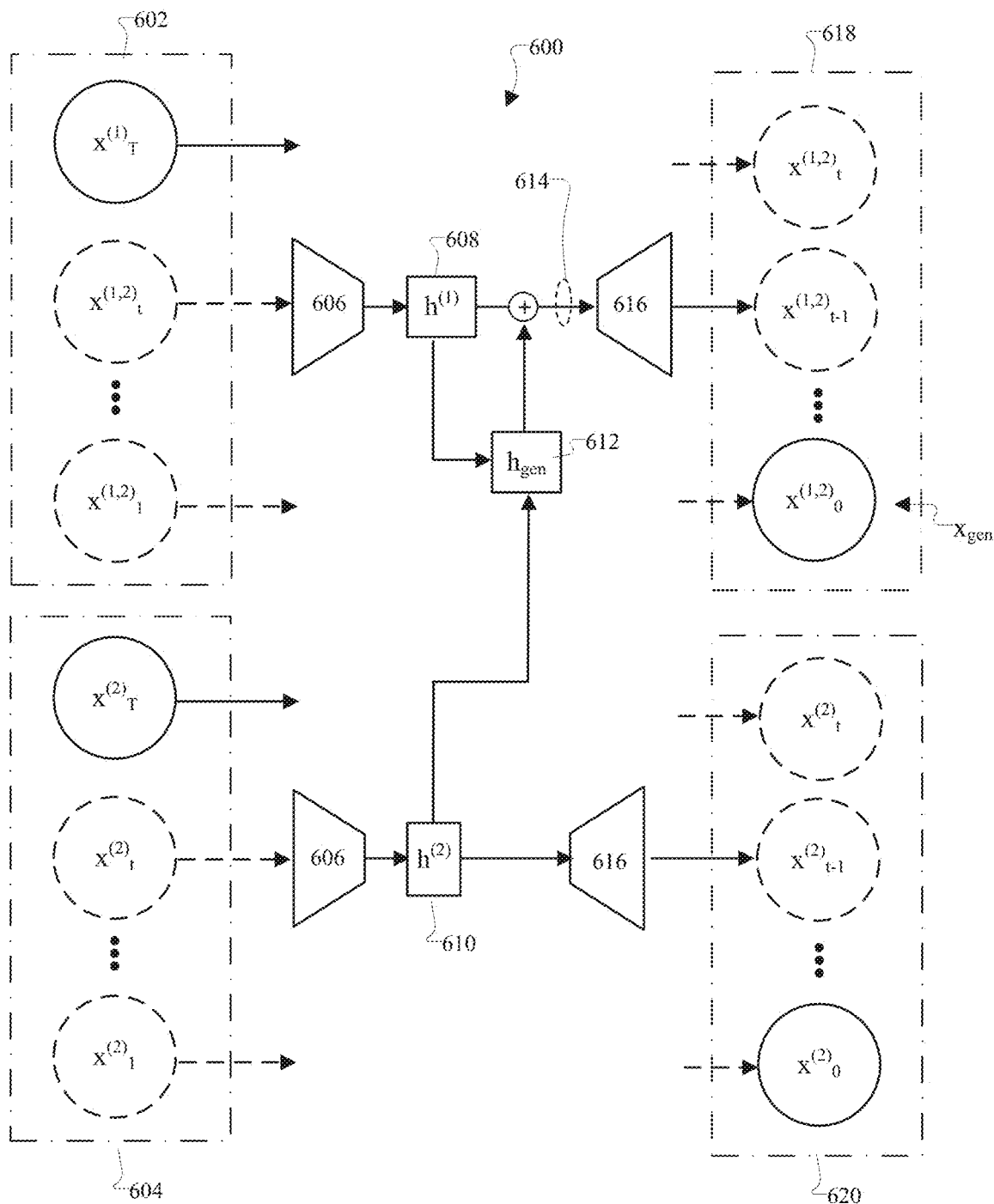
FIG. 6 is a diagram of an example of a diffusion-based process with image guidance according to an example embodiment of this disclosure.

FIG. 6 is a diagram of an example of a process 600 that includes reverse diffusion with image guidance according to an example embodiment. The AD system 100 uses the DiffStyle process to create image-guided generations. In the DiffStyle process, a first image $I^{(1)}$ and a second image $I^{(2)}$ are converted to latent space through a forward diffusion process, producing first latent code $x_T^{(1)}$ and second latent code $x_T^{(2)}$. The first latent code $x_T^{(1)}$ has a first h-space component $h^{(1)}$. The second latent code $x_T^{(2)}$ has a second h-space component $h^{(2)}$.

Next, the AD system 100 performs a simple linear interpolation between the first h-space component $h^{(1)}$ and the second h-space component $h^{(2)}$. The AD system 100 performs linear interpolation using equation 5 to generate $h_{gen}$, which may be referred to as "additional embedding data."

$$h_{gen} = (1-\gamma)h^{(1)} + \gamma h^{(2)} \qquad [5]$$

The AD system 100 performs Asyrp using first latent code $x_T^{(1)}$, where the h-space (i.e., the inner-most component of the UNet) is replaced by $h_{gen}$ during the process 600, which includes a reverse diffusion process. The AD system 100 is configured to consider the first image $I^{(1)}$ as being the "style image" and the second image $I^{(2)}$ as being the "content image." Also, in equation 5, $\gamma$ represents the relative strength of the content image during style transfer of the style image. For example, the AD system 100 used $\gamma = 0.7$ $\gamma$ as the default in some experiments.

When generating synthetic outliers for anomaly detection, the AD system 100 assumes that no information about the outlying distribution is known. Thus, the AD system 100 only performs DiffStyle with known elements, such as with benign, in-class examples of the benign in-class dataset 102 (e.g., a public dataset such as Tiny-ImageNet) for outlier exposure 116.

Also, as an example, FIG. 6 illustrates the process 600 involving (i) a number of iterations of input data 602 and corresponding output data 618 and (ii) a number of iterations of input data 604 and corresponding output data 620. In addition, the AD system 100 includes a number of iterations of the process 600 in which (i) input data 602 from $x_T^{(1)}$ to $x_T^{(1,2)}$ generates output data 618 from $x_t^{(1,2)}$ to $x_0^{(1,2)}$, respectively, where $x_0$ refers to the generated/modified/synthetic image for the dataset 112. FIG. 6 shows that the process 600 involves at least an encoder 606 of a diffusion model 104 and a decoder 310 of a diffusion model 104. The encoder 606 receives the input data 602 and generates embedding data 608 by encoding the input data 602. The encoder 606 also receives the input data 604 and generates embedding data 610 by encoding the input data 604. As an example iteration, the AD system 100 is configured to (a) generate embedding data 608 (i.e., $h^{(1)}$), via the encoder 606, by encoding $x_T^{(1)}$, (b) generate embedding data 610 (i.e., $h^{(2)}$), via the encoder 606, by encoding $x_T^{(2)}$, (c) generate additional embedding data 612 (i.e., $h_{gen}$) by combining the embedding data 608 (i.e., $h^{(1)}$) and the embedding data 610 (i.e., $h^{(2)}$) via equation 5, (d) generate updated embedding data 614 by combining the embedding data 608 (i.e., $h^{(1)}$) and the additional embedding data 612 (i.e., $h_{gen}$), (e) generate $x_t^{(1,2)}$ as output data 618 by decoding, via the decoder 616, the updated embedding data 614 such that $x_t^{(1,2)}$ represents a version of a generated/synthetic/modified image, and (f) generate $x_t$ as output data 620 by decoding, via the decoder 616, the embedding data 610 (i.e., $h^{(2)}$) such that $x_t^{(2)}$ represents a version of a generated/synthetic/modified image. As another example, for instance, in the next iteration, the AD system 100 is configured to (a) generate embedding data 608 (i.e., $h^{(1)}$), via the encoder 606, by encoding $x_t^{(1,2)}$, (b) generate embedding data 610 (i.e., $h^{(2)}$), via the encoder 606, by encoding $x_t^{(2)}$, (c) generate additional embedding data 612 (i.e., $h_{gen}$) by combining the embedding data 608 (i.e., $h^{(1)}$) and the embedding data 610 (i.e., $h^{(2)}$) via equation 5, (d) generate updated embedding data 614 by combining the embedding data 608 (i.e., $h^{(1)}$) and the additional embedding data 612 (i.e., $h_{gen}$), (e) generate $x_{t-1}^{(1,2)}$ as output data 618 by decoding, via the decoder 616, the updated embedding data 614 such that $x_{t-1}^{(1,2)}$ represents a version of a, generated/synthetic/modified image, and (f) generate $x_{t-1}^{(2)}$ as output data 620 by decoding, via the decoder 616, the embedding data 610 (i.e., $h^{(2)}$) such that $x_{t-1}^{(2)}$ represents a version of a generated/synthetic/modified image. The AD system 100 is configured to continue this process 300 for a number of iterations until a generated/modified/synthetic image ($x_0$) is generated as output data 314. In this example, for instance, the dataset 112 includes at least (i) source images from the benign in-class dataset 102 along with corresponding normal/non-anomalous labels and (ii) each generated/modified/synthetic images ($x_0$) along with corresponding anomalous labels.

Figure 7:
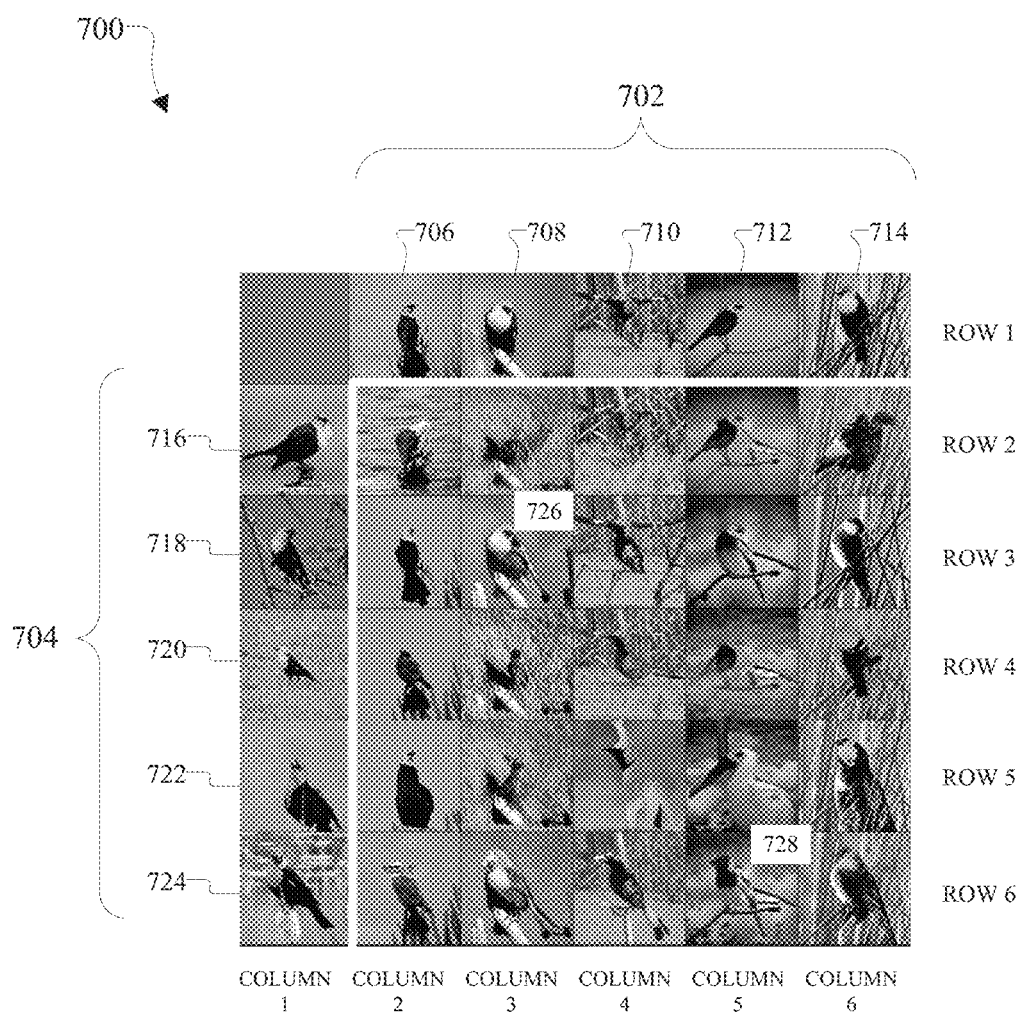
FIG. 7 is a diagram with another example of a set of synthetic out-of-distribution images according to an example embodiment of this disclosure.

FIG. 7 is a is a diagram with another example of a dataset 700, which includes source images and synthetic out-of-distribution images according to an example embodiment. More specifically, the dataset 700 includes a number of source images, which include a set 702 of "first images" (e.g., "first source images") that are shown in a first row and a set 704 of "second images" (e.g., "second source images") that are shown in a first column. In FIG. 7, the set 702 of first source images include first source image 706, first source image 708, first source image 710, first source image 712, and first source image 714. In FIG. 7, the set 704 of second source images include second source image 716, second source image 718, second source image 720, second source image 722, and second source image 724. Each first image represents a style image $I^{(1)}$. Meanwhile, each second image represents a content image $I^{(2)}$. The generated images are shown in the region between the first row and the first column such that set of generated images include column 2 to column 6 as bounded by row 2 to row 6. In this non-limiting example, for instance, there are 25 generated images shown in FIG. 7. Each generated image (i.e., $x_0$) is created based on the process 600 shown in FIG. 6 using image guidance via $h_{gen}$, as expressed in equation 5. In this regard, as a non-limiting example, the generated image 726 (i.e., $x_0$) is generated using first source image 708 and second source image 718 via the process 600 with image-guidance of FIG. 6. Also, as another non-limiting example, the generated image 728 (i.e., $x_0$) is generated using first source image 712 and second source image 724 via the process 600 with image-guidance of FIG. 6. The other generated images in FIG. 7 are created from their corresponding first source images from the set 702 disposed in the same column and their corresponding second images from the set 704 disposed in the same row. As aforementioned, the combined set 700 (e.g., all of the source images and all of the generated images shown in FIG. 7) are examples of training data that may be used in training the anomaly detection model 114 for a given application.

Figure 8:
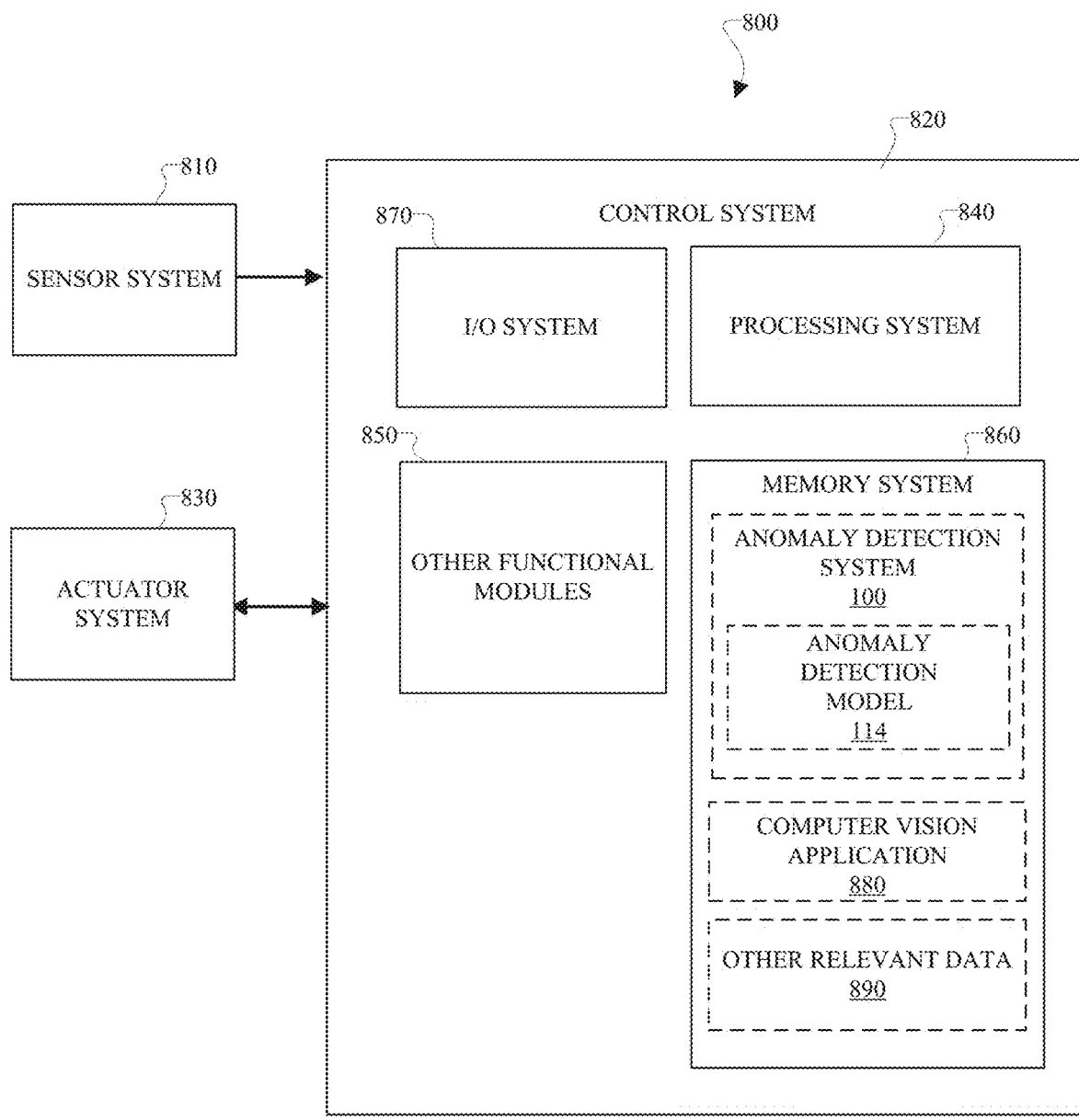
FIG. 8 is a diagram of an example of a control system that includes at least a trained anomaly detection model and/or the anomaly detection system according to an example embodiment of this disclosure.

FIG. 8 is a diagram of an example of a system 800 that employs the AD system 100 and/or the trained anomaly detection model 114 of FIGS. 1-2 according to an example embodiment. FIG. 8 is a diagram of the system 800, which includes the AD system 100. In this example, the system 800 is includes at least a sensor system 810, a control system 820, and an actuator system 830. The system 800 is configured such that the control system 820 controls the actuator system 830 based on sensor data from the sensor system 810. More specifically, the sensor system 810 includes one or more sensors and/or corresponding devices to generate sensor data. For example, the sensor system 810 includes an image sensor, a camera, a radar sensor, a light detection and ranging (LIDAR) sensor, a thermal sensor, an ultrasonic sensor, an infrared sensor, a motion sensor, a satellite-based navigation sensor (e.g., Global Positioning System (GPS) sensor), an optical sensor, an audio sensor, any suitable sensor, or any number and combination thereof. Upon obtaining detections from the environment, the sensor system 810 is operable to communicate with the control system 820 via an input/output (I/O) system 870 and/or other functional modules 850, which includes communication technology.

The control system 820 is configured to obtain the sensor data directly or indirectly from one or more sensors of the sensor system 810. In this regard, the sensor data may include sensor data from a single sensor or sensor-fusion data from a plurality of sensors. Upon receiving input, which includes at least sensor data, the control system 820 is operable to process the sensor data via the processing system 840. In this regard, the processing system 840 includes at least one processor. For example, the processing system 840 includes an electronic processor, a CPU, a GPU, a TPU, a microprocessor, an FPGA, an ASIC, processing circuits, any suitable processing technology, or any number and combination thereof. Upon processing at least this sensor data, the processing system 840 is configured to extract, generate, and/or obtain proper input data (e.g., digital image data) for the AD system 100. In addition, the processing system 840 is operable to generate output data (e.g., prediction data indicative of anomalous sensor data or non-anomalous/normal sensor data) via the AD system 100 based on communications with the memory system 860. In addition, the processing system 840 is operable to provide actuator control data to the actuator system 830 based on the output data (e.g., prediction data from the trained anomaly detection model).

The memory system 860 is a computer or electronic storage system, which is configured to store and provide access to various data to enable at least the operations and functionality, as disclosed herein. The memory system 860 comprises a single device or a plurality of devices. The memory system 860 includes electrical, electronic, magnetic, optical, semiconductor, electromagnetic, any suitable memory technology, or any combination thereof. For instance, the memory system 860 may include RAM, ROM, flash memory, a disk drive, a memory card, an optical storage device, a magnetic storage device, a memory module, any suitable type of memory device, or any number and combination thereof. In an example embodiment, with respect to the control system 820 and/or processing system 840, the memory system 860 is local, remote, or a combination thereof (e.g., partly local and partly remote). For example, the memory system 860 may include at least a cloud-based storage system (e.g. cloud-based database system), which is remote from the processing system 840 and/or other components of the control system 820.

The memory system 860 includes at least the AD system 100, which is executed via the processing system 840. The AD system 100 is configured to receive or obtain input data, which includes at least one digital image (e.g., sensor data or digital image based on the sensor data). In addition, the AD system 100, via the processing system 840, is configured to generate output data (e.g., prediction data indicative of anomalies or non-anomalies) based on the input data (e.g., digital image). In this case, the AD system 100 employs at least a trained anomaly detection model 114, which has been trained with a dataset 112, which includes source images and generated/synthetic/modified images. In addition, the memory system 860 includes a computer vision application 880, which includes computer readable data including instructions that uses the output data of the trained anomaly detection model 114 and/or the AD system 100 to provide a number of computer vision services for the control system 820. The computer vision application 880 works with the AD system 100 to provide a number of computer vision services (e.g., identifying normal/non-anomalous products and/or defective/anomalous products in manufacturing) to the control system 820 so that the control system 820 may control the actuator system 830 according to the computer vision services. The memory system 860 is also configured to store other relevant data 890, which relates to the operation of the system 800 in relation to one or more components (e.g., sensor system 810, the actuator system 830, etc.).

Furthermore, as shown in FIG. 8, the system 800 includes other components that contribute to operation of the control system 820 in relation to the sensor system 810 and the actuator system 830. Also, as shown in FIG. 8, the control system 820 includes the I/O system 870, which includes one or more interfaces for one or more I/O devices that relate to the system 800. For example, the I/O system 870 provides at least one interface to the sensor system 810 and at least one interface to the actuator system 830. Also, the control system 820 is configured to provide other functional modules 850, such as any appropriate hardware technology, software technology, or any combination thereof that assist with and/or contribute to the functioning of the system 800. For example, the other functional modules 850 include an operating system and communication technology that enables components of the system 800 to communicate with each other as described herein. With at least the configuration discussed in the example of FIG. 8, the system 800 is applicable in various technologies.

Figure 9:
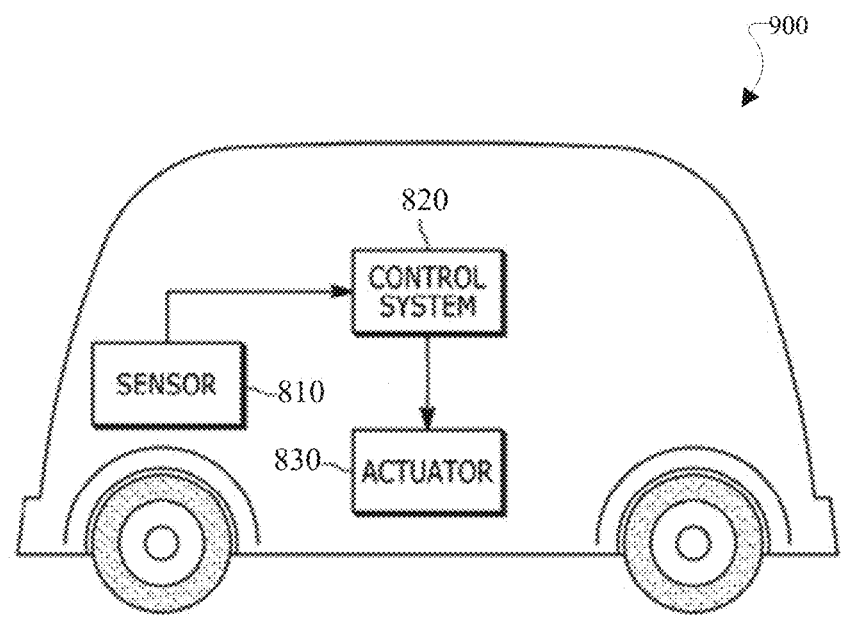
FIG. 9 is a diagram of the control system of FIG. 8 with respect to mobile machine technology according to an example embodiment of this disclosure.

FIG. 9 is a diagram of the control system of FIG. 8 with respect to mobile machine technology according to an example embodiment. As a non-limiting example, the mobile machine technology 900 includes at least a partially autonomous vehicle or robot. In FIG. 9, the mobile machine technology 900 is at least a partially autonomous vehicle, which includes a sensor system 810. The sensor system 810 includes an optical sensor, an image sensor, a video sensor, an ultrasonic sensor, a position sensor (e.g. GPS sensor), a radar sensor, a LIDAR sensor, any suitable sensor, or any number and combination thereof. One or more of the sensors may be integrated with respect to the vehicle. The sensor system 810 is configured to provide sensor data to the control system 820.

The control system 820 is configured to obtain or generate image data, which is based on sensor data or sensor-fusion data from the sensor system 810. In addition, the control system 820 is configured to pre-process the sensor data to provide input data of a suitable form (e.g., digital image data) to the AD system 100. The AD system 100 is advantageously configured to provide prediction data regarding anomalies with respect to autonomous driving.

In addition, the control system 820 is configured to generate actuator control data, which is based at least on output data (e.g. prediction data, etc.) of the AD system 100 in accordance with the computer vision application 880. In this regard, the control system 820 is configured to generate actuator control data that allows for safer and more accurate control of the actuator system 830 of the vehicle by the prediction data (e.g., anomalous detections and/or the non-anomalous detections) provided by the AD system 100. The actuator system 830 may include a braking system, a propulsion system, an engine, a drivetrain, a steering system, or any number and combination of actuators of the vehicle. The actuator system 830 is configured to control the vehicle so that the vehicle follows rules of the roads and avoids collisions based at least on the output data (e.g. prediction data) that is generated by the AD system 100 in response to receiving one or more digital images based on the sensor data.

Figure 10:
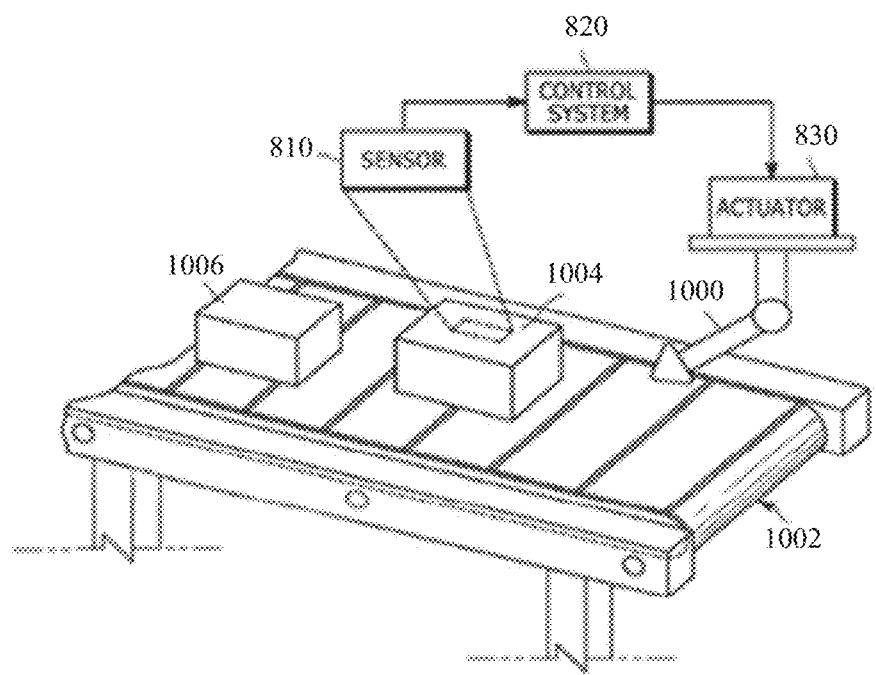
FIG. 10 is a diagram of the control system of FIG. 8 with respect to manufacturing technology according to an example embodiment of this disclosure.

FIG. 10 depicts a schematic diagram of control system 820 configured to control a system 1000 (e.g., manufacturing machine), which may include a punch cutter, a cutter, a gun drill, or the like, of a manufacturing system 1002, such as part of a production line. Control system 820 may be configured to control actuator system 830, which is configured to control the system 1000 (e.g., manufacturing machine).

Sensor 810 of the system 1000 (e.g., manufacturing machine) may be an optical sensor configured to capture one or more properties of a manufactured product 1004. Control system 820, via the trained anomaly detection model 114, may be configured to determine a state (e.g., anomalous or non-anomalous, defective or non-defective, etc.) of manufactured product 1004 from sensor data (e.g., one or more digital images) captured by the sensor system 810. Actuator system 830 may be configured to control the system 1000 (e.g., manufacturing machine) depending on the determined state of a manufactured product 1004 for a subsequent manufacturing step of the manufactured product 1006. The actuator system 830 may be configured to control functions of the system 1000 (e.g., manufacturing machine) on a subsequent manufactured product 1006 of system 1000 (e.g., manufacturing machine) depending on the determined state of manufactured product 1004.

Figure 11:
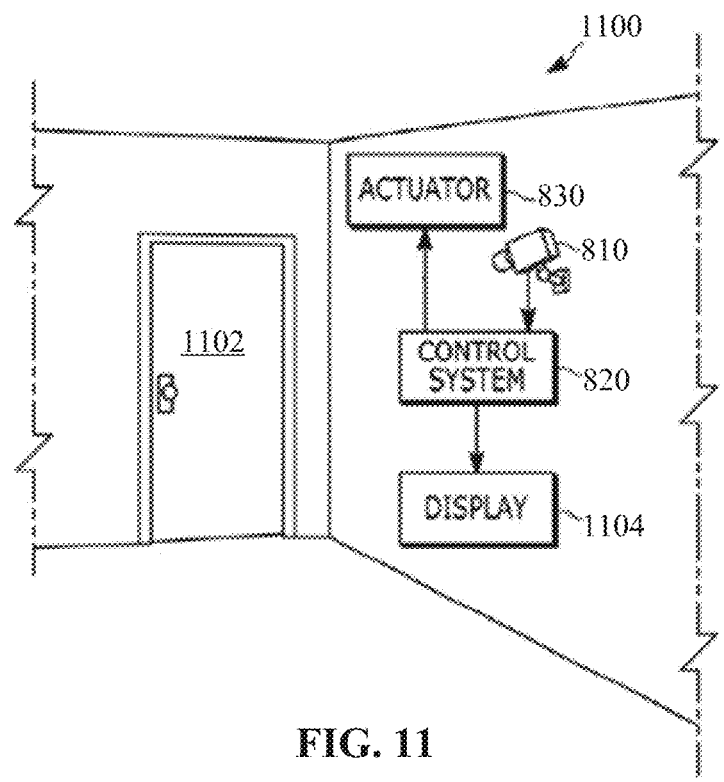
FIG. 11 is a diagram of the control system of FIG. 8 with respect to security technology according to an example embodiment of this disclosure.

FIG. 11 is a diagram of the control system of FIG. 8 with respect to security technology according to an example embodiment. As a non-limiting example, the security technology 1100 includes at least a monitoring system, a control access system, a surveillance system, or any suitable type of security apparatus. For instance, as one example, FIG. 11 relates to security technology 1100, which is configured to physically control a locked state and an unlocked state of a lock of the door 1102 and display an enhanced image/video on the display technology 1104. The security technology 1100 may also trigger an alarm and/or provide electronic notifications to other communication devices/technologies. In this example, the sensor system 810 includes at least an image sensor that is configured to provide image/video data. The sensor system 810 may also include other sensors, such as a motion sensor, infrared sensor, etc.

The control system 820 is configured to obtain the image/video data from the sensor system 610. In addition, the control system 820 is configured to generate actuator control data that allows for safer and more accurate control of the actuator system 830 by using output data (e.g. prediction data indicative of anomalous detection or non-anomalous detection), which is generated by the AD system 100. The control system 820 is configured to display the output data of the AD system 100, or any data relating to the computer vision application 880, or any number and combination thereof on the display technology 1104.

Figure 12:
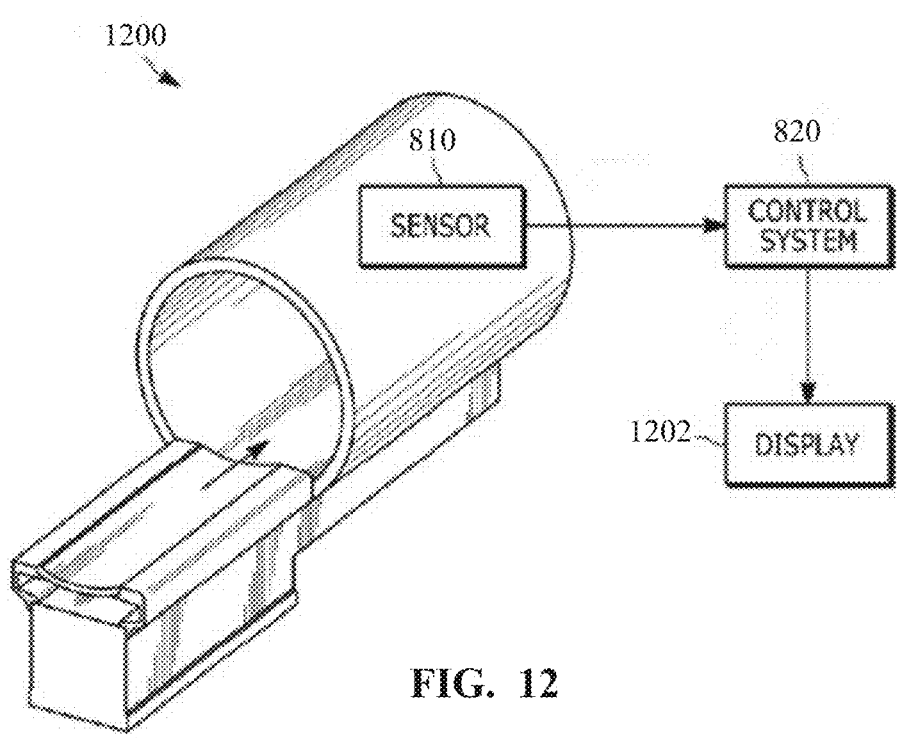
FIG. 12 is a diagram of the control system of FIG. 8 with respect to imaging technology according to an example embodiment of this disclosure.

FIG. 12 is a diagram of the control system of FIG. 8 with respect to imaging technology according to an example embodiment. FIG. 12 is a diagram of the system 800 with respect to imaging technology 1200 according to an example embodiment. As a non-limiting example, the imaging technology 1200 includes a magnetic resonance imaging (MRI) apparatus, an x-ray imaging apparatus, an ultrasonic apparatus, a medical imaging apparatus, any suitable type of imaging apparatus, or any number and combination thereof. In FIG. 12, the sensor system 810 includes at least one image sensor. The control system 820 is configured to obtain image data from the sensor system 810. The control system 820, via at least the trained anomaly detection model 114, is also configured to generate prediction data indicative of anomalous detection or non-anomalous detection based on the sensor data (e.g. digital image). In addition, the control system 820 is configured to display the any relevant data (e.g., sensor data, prediction data, output data of the AD system 100, relevant data from the computer vision application 880, or any number and combination thereof) on the display 1202.

As described above, the embodiments are advantageous and provide a number of benefits. For example, the AD system 100 is configured to estimate the performance of anomaly detection models without access to any real abnormal samples. Also, the AD system 100 is configured to generate synthetic abnormal samples by interpolating real, normal images with a pretrained diffusion model 104. In this regard, the generation of synthetic abnormal samples requires no model training since the diffusion model 104 is pretrained and no access to real abnormal samples. The AD system 100 builds a synthetic test set with the real normal images and the synthetic abnormal samples. Extensive experiments show that the rank of various anomaly detection models 114 trained on the herein disclosed synthetic test set matches their rank on the real test set. Also, the synthetic test set enables anomaly-free hyperparameter tuning of anomaly detection models 114.

Also, the AD system 100 is configured to leverage the semantic space in the diffusion models to perform training-free style transfer and outlier synthesis. The AD system 100 demonstrates that, even when using only inlier data as inputs to the diffusion process, a set of near-distribution outliers can be created that closely estimates the performance of genuine validation datasets. The AD system 100 is configured to generate synthetic outliers (e.g., the generated/modified/synthetic images). The AD system 100 is configured to provide an accurate estimate of validation performance and is therefore useful in selecting between candidate anomaly detection models. In this regard, the AD system 100 has been evaluated across several model types and datasets, demonstrating its generality.

In addition, by controlling a generation of synthetic outliers and generating the dataset 112, the AD system 100 overcomes a large hurdle in the deployment of anomaly detection methods in which there is often a lack of validation techniques in the absence of labeled anomalies such as in industrial settings, medical settings, etc. Also, given a new environment, e.g., a new factory or a new medical device, the AD system 100 is advantageous in providing a labeled dataset 112 with synthetic outliers in many environments in which there is no existing labeled dataset that can be used to validate that a given anomaly detection model will detect anomalies of interest.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for anomaly detection, the computer-implemented method comprising:
receiving a first source image from a first image set and a second source image from a second image set of an in-distribution image dataset;
generating, via a diffusion model, a modified image using the first source image and the second source image;
automatically generating a non-anomalous label for the first source image and the non-anomalous label for the second source image;
automatically generating an anomalous label for the modified image;
creating a training dataset that includes at least the first source image with the non-anomalous label, the second source image with the non-anomalous label, and the modified image with the anomalous label; and
training or fine-tuning a machine learning model using the training dataset, the machine learning model being configured to perform a task of anomaly detection.

2. The computer-implemented method of claim 1, wherein:
the machine learning model comprises a classifier or a regression model; and
the diffusion model is pretrained and frozen when generating the modified image.

3. The computer-implemented method of claim 1, further comprising:
receiving a third source image from the first image set and a fourth source image from the second image set;
generating, via the diffusion model, another modified image using the third source image and the fourth source image;
automatically generating the non-anomalous label for the third source image and the non-anomalous label for the fourth source image;
automatically generating the anomalous label for the another modified image; and
creating an additional dataset that includes at least the third source image with the non-anomalous label, the fourth source image with the non-anomalous label, and the another modified image with the anomalous label.

4. The computer-implemented method of claim 3, further comprising:
validating the machine learning model using the additional dataset; and
selecting the machine learning model from among other machine learning models for testing and employment.

5. The computer-implemented method of claim 1, wherein the modified image comprises a style of the first image and content of the second image.

6. The computer-implemented method of claim 1, wherein the diffusion model generates the modified image by performing linear interpolation on at least a first latent code of the first source image and a second latent code of the second source image.

7. The computer-implemented method of claim 1, further comprising:
employing the machine learning model to generate prediction data in response to receiving current sensor data, the prediction data indicating that the current sensor data is anomalous data or non-anomalous data; and
controlling an actuator using the prediction data.

8. A system for anomaly detection, the system comprising:
one or more processors;
at least one non-transitory computer readable medium in data communication with the one or more processors, the at least one non-transitory computer readable medium having computer readable data including instructions stored thereon that, when executed by the one or more processors is configured to cause the one or more processors to perform a method that comprises:
receiving a first source image from a first image set and a second source image from a second image set of an in-distribution image dataset;
generating, via a diffusion model, a modified image using the first source image and the second source image;
automatically generating a non-anomalous label for the first source image and the non-anomalous label for the second source image;
automatically generating an anomalous label for the modified image;
creating a training dataset that includes at least the first source image with the non-anomalous label, the second source image with the non-anomalous label, and the modified image with the anomalous label; and
training or fine-tuning a machine learning model using the training dataset, the machine learning model being configured to perform a task of anomaly detection.

9. The system of claim 8, wherein:
the machine learning model comprises a classifier or a regression model; and
the diffusion model is pretrained and frozen when generating the modified image.

10. The system of claim 8, wherein the method further comprises:
receiving a third source image from the first image set and a fourth source image from the second image set;
generating, via the diffusion model, another modified image using the third source image and the fourth source image;
automatically generating the non-anomalous label for the third source image and the non-anomalous label for the fourth source image;
automatically generating the anomalous label for the another modified image; and
creating an additional dataset that includes at least the third source image with the non-anomalous label, the fourth source image with the non-anomalous label, and the another modified image with the anomalous label.

11. The system of claim 10, wherein the method further comprises:
validating the machine learning model using the additional dataset; and
selecting the machine learning model from among other machine learning models for testing and employment.

12. The system of claim 8, wherein the modified image comprises a style of the first image and content of the second image.

13. The system of claim 12, wherein the diffusion model generates the modified image by performing linear interpolation on at least a first latent code of the first source image and a second latent code of the second source image.

14. The system of claim 8, wherein the method further comprises:
employing the machine learning model to generate prediction data in response to receiving current sensor data, the prediction data indicating that the current sensor data is anomalous data or non-anomalous data; and controlling an actuator using the prediction data.

15. A non-transitory computer readable medium having computer readable data including instructions stored thereon, the computer readable data being executable by one or more processors to perform a method that comprises:

receiving a first source image from a first image set and a second source image from a second image set of an in-distribution image dataset;

generating, via a diffusion model, a modified image using the first source image and the second source image;

automatically generating a non-anomalous label for the first source image and the non-anomalous label for the second source image;

automatically generating an anomalous label for the modified image;

creating a training dataset that includes at least the first source image with the non-anomalous label, the second source image with the non-anomalous label, and the modified image with the anomalous label; and training or fine-tuning a machine learning model using the training dataset, the machine learning model being configured to perform a task of anomaly detection.

16. The non-transitory computer readable medium of claim 15, wherein:

the machine learning model comprises a classifier or a regression model; and the diffusion model is pretrained and frozen when generating the modified image.

17. The non-transitory computer readable medium of claim 15, further comprises:

receiving a third source image from the first image set and a fourth source image from the second image set;

generating, via the diffusion model, another modified image using the third source image and the fourth source image;

automatically generating the non-anomalous label for the third source image and the non-anomalous label for the fourth source image;

automatically generating the anomalous label for the another modified image; and creating an additional dataset that includes at least the third source image with the non-anomalous label, the fourth source image with the non-anomalous label, and the another modified image with the anomalous label.

18. The non-transitory computer readable medium of claim 17, validating the machine learning model using the additional dataset; and selecting the machine learning model from among other machine learning models for testing and employment.

19. The non-transitory computer readable medium of claim 15, wherein:

the modified image comprises a style of the first image and content of the second image; and the diffusion model generates the modified image by performing linear interpolation on at least a first latent code of the first source image and a second latent code of the second source image.

20. The non-transitory computer readable medium of claim 15, further comprising:

employing the machine learning model to generate prediction data in response to receiving current sensor data, the prediction data indicating that the current sensor data is anomalous data or non-anomalous data; and controlling an actuator using the prediction data.

* * * * *